Patented May 23, 1933

1,910,406

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

CELLULOSE COMPOSITION

No Drawing. Original application filed May 24, 1930, Serial No. 455,456. Divided and this application filed March 26, 1931. Serial No. 525,614.

In the manufacture of some varieties of paper, it is customary practice to obtain certain desired characteristics by incorporating finely divided solids into the fiber stock or furnish from which the body of the paper is made, or to coat the paper with compositions containing such solids. When the body of the paper contains the solids distributed therethrough, it is known as a filled or loaded paper, or if it carries such solids on its surface, it is termed a coated paper.

The present application is concerned more particularly with compositions containing pulverized cellulose, and is a division of my application Serial No. 455,456, filed May 24, 1930. Such compositions are especially valuable in papermaking, in which case the compositions may be used as an addition to the fiber stock or furnish from which the body of the paper is made, or may be applied as a coating to either or both faces of the already fabricated paper. They may be used in coating other sheet materials, for instance woven fabrics, intended to serve for writing or printing purposes, or in any other connections in which they may serve beneficially.

The pulverized cellulose of the present invention is prepared from cellulose fiber of any suitable origin, preferably by mechanical means in order to preserve the chemical constitution of the fiber. It is essential that the subdivision of the fiber should occur in the absence of a substantial proportion of water, which not only tends to retard pulverization but also to hydrate or gelatinize the cellulose into a form quite different from that desired for the present purpose. In fact, it is preferable that the fiber be in a bone-dry condition during the pulverizing operation, as in such condition it is most brittle and lends itself to subdivision with a minimum expenditure of power. The fiber may be pulverized in impact machines, such as hammer mills or ball mills, which have been found to be admirably suited for carrying out the pulverizing operation, but any other suitable grinding, crushing, or cutting machines may be employed. When ball mills are used, the heat generated during grinding, particularly during the summer season, may be sufficient to cause a yellowing of the cellulose even when the fiber used as a raw material is of high alpha cellulose content and comparatively free from components such as beta and gamma celluloses, lignin, resins, etc., which tend to darken under heat. In such case, heat generated during the pulverizing operation may be removed from the charge by delivering a current of comparatively cool air thereagainst or against the grinding surfaces during the pulverizing operation. If there is trouble in maintaining a bone-dry condition in the cellulose during the grinding, the charge may be allowed to increase in temperature by frictional heat so as to avoid the formation of rust or other impurities on such parts of the ball mill as may be subject to oxidation or change in the presence of moist air. For example, the temperature of the charge may be allowed to increase to 60° to 70° C, without material effect on the cellulose when using an iron ball mill equipped with iron rods. Unless such temperature conditions are maintained when using such pulverizing equipment, sufficient moisture is absorbed by the cellulose from the atmosphere, particularly on a humid day, to cause a progressive rusting of the iron, which may so contaminate the cellulose as to impart a tan or even a brown color thereto.

The fiber may be pulverized to various degrees of fineness, for instance, to particles of a size of from 40 to 200 mesh, depending upon the surface characteristics desired in the finished paper product. When a comparatively rough surface known as an egg-shell finish is desired, the cellulose fiber may be powdered to a particle size of 40 mesh or coarser, but if a smooth surface or finish is desired, the fiber should be reduced to particles preferably of impalpable fineness. When the pulverizing operation is carried out in a ball mill, it is possible, after a prescribed period of time, to reduce most of the fiber to a given particle size, but the powdered product may contain a certain amount of powdered cellulose coarser than that desired. Ordinarily, the powdered batch as a whole may be used, but in certain instances where it is desired to control accurately the characteristics of the finished paper, the powdered batch may be graded into portions of different particle size, as by sifting through wire cloths or sieves, by carrying off the finer particles from the coarser particles in a current of air, or by floating off the finer particles in a stream of water delivered into an aqueous suspension of the powder. Any other methods used in grading or classifying pulverulent materials such as paint-pigments may be applied to the pulverized cellulose.

Pulverized cellulose produced as hereinbefore described does not take on a slimy or slippery condition in water, even when an aqueous suspension thereof is subjected to intensive mechanical action, as in a beater engine. In other words, a slurry prepared from the pulverized cellulose is quite different from the so-called slow or highly gelatinized stocks produced by papermakers, as for the manufacture of glassine papers. Even after prolonged suspension in water, the pulverized cellulose retains what appears to be a granular form not unlike that of the usual mineral fillers used in paper manufacture, but the pulverized cellulose is not as dense as those fillers. It is hence reasonable to anticipate that the pulverized cellulose, when used in papers, behaves more nearly like a filler than highly gelatinized cellulose, and such is the case. This property renders the pulverized cellulose valuable for use in paper manufacture in lieu of or along with the usual mineral filling or coating materials to produce effects in the paper which are difficult otherwise to obtain. For example, the incorporation of the pulverulent cellulose into the paper stock not only increases the opacity of the resulting paper, but also enhances its flatness or smoothness of surface, particularly when the pulverulent cellulose is of impalpable fineness. The pulverulent cellulose may therefore be used to control the opaqueness and flatness of the finished paper, which characteristics, particularly in a stock containing no added fillers, have been dependent largely on the extent to which the fiber has been hydrated or beaten. Thus, the greater the degree of hydration of a fiber, the higher will be its transparency when in paper form,—this principle being attested to by the glassine papers obtained from highly hydrated cellulose fiber, and, on the other hand, the papetrie and vellum papers obtained from lightly hydrated cellulose fiber. By incorporating pulverulent cellulose into a well-beaten stock, it is possible to realize the strength, formation, and other desirable characteristics of paper made from a well-hydrated fiber, with the opacity, softness, and other characteristics of paper made from a lightly hydrated fiber. The particular characteristics attained in the finished paper may be varied, depending upon the degree of hydration of the paper stock and the derivation and fineness of particle size of the pulverulent cellulose which is added thereto. In any event, however, it is possible for a paper manufacturer, in accordance with the present invention, to produce papers having characteristics heretofore realized, if at all, by the use of mineral fillers, without the use of such mineral fillers. These characteristics are obtainable by the use of the same material, namely, cellulose, of which the body of the paper is made, so that the paper manufacturer does not have to rely upon mineral materials which have sometimes been classified as adulterants. The present invention, also, by dispensing with the necessity for the use of mineral fillers, further makes the paper manufacturer independent of control by those engaged in marketing mineral fillers,—a raw material which most paper manufacturers must obtain from outside sources.

In producing papers filled or loaded with the pulverulent cellulose, the procedure followed may be more or less analogous to that of incorporating the usual mineral fillers. That is to say, the pulverulent cellulose may be added to the stock in the beater engine before or after the beating operation or while beating is in progress. Various amounts of pulverulent cellulose may be added, say from as low as 2% to 5% to as high as from 20% to 50%, based on fiber, depending upon the characteristics desired in the finished paper. The pulverulent cellulose may be of a definite particle size, such as obtained from a grading operation, or an aggregation of particles of various sizes, such as is present in an ungraded batch, or a synthesis of particles of two or more definite degrees of fineness. Preferably, the addition of the pulverulent cellulose is made after the beating operation and after it has been passed through a jordan or other refining engine, if the beaten stock is subjected to refining. The addition of the powdered cellulose at this stage of stock treatment avoids the possibility of the pulverulent cellulose undergoing hydration or gelatinization as a result of beating or grinding action. Preferably, the powdered cellulose is added in the form of an aqueous milk or slurry, in which condition formation of clumps or aggregates in the stock does not take place, particularly when a small amount of hydrophilic colloid such as starch, glue, gelatine, or soap, is present in the water used as a suspension medium. The hydrophilic colloid further tends to keep the powder in suspension, so that it does not tend to settle out in the beater engine and vats in which the finished stock is handled on its way to the paper machine. When papers having ink resistance are being produced rather than so-called waterleaf papers, not only may the main charge of pulp in the beater engine be sized as usual, as with rosin size, but the pulverulent cellulose in the form of a slurry may be similarly sized before being added to the pulp in the beater engine. Rather than being precipitated on the pulverulent cellulose before it is added to the charged beater engine, the rosin size may be maintained in soluble condition in the slurry of pulverulent cellulose until the slurry is added to the beater charge, in which case the rosin size, being a soap, tends to keep the powder free from clumps or aggregates until it is distributed through the fiber stock, whereupon it may be precipitated as usual with alum on the stock.

The principles of the present invention are applicable in the manufacture of composite or multi-ply papers, in which case the stock used for the inner plies may be highly beaten, so that such inner plies will have high strength, whereas the outer plies may either be lightly or well beaten and contain sufficient pulverulent cellulose so that the resulting multi-ply sheet will be opaque. In such case, the outer plies should contain a large proportion of powdered cellulose, which, in addition to imparting opacity, will give the finished sheet a velvety feel quite different from the harsh feel of papers made from highly gelatinized stock. For instance, the furnish for the outer plies may be made up of a mixture of, say, 50% of fiber and 50% powdered cellulose, and in some instances small quantities of such material as starch, glue, or casein. Or, in some instances, the pulverulent cellulose may be desirable as a constituent of one or more of the inner plies of a multi-ply sheet produced as on a multiple-cylinder machine. For example, the multi-ply sheet may be one comprising inner plies containing sufficient pulverulent cellulose to impart bulk and softness thereto and outer plies made of well-beaten stock to give a comparatively dense, hard surface,—the sheet as a whole having more or less compressibility and good ink resistance. If desired, the powdered cellulose may be used as the covering element in compositions intended for coating papers or other fabrics, along with glue, casein, gelatine, viscose, or other preferably water-soluble adhesives such as employed in such compositions, in which case the composition may be applied by the use of brushes, "kissing" rolls, or the other instrumentalities customarily used in the manufacture of coated papers. The coated product is characterized by its lower gloss, higher opacity, and greater flexibility than paper which has been coated with a composition in which a mineral color has been employed as the covering element.

If desired, the pulverized cellulose may be used together with mineral powders such as barium sulphate, calcium carbonate, clay, talc, etc., in the production of filled and/or coated papers as hereinbefore described. The mineral powder is preferably mixed with the fiber from which the pulverulent cellulose is to be prepared, as the mineral powder facilitates the pulverization of the fiber and the pulverizing operation serves to effect an intimate and uniform mixture of the two powders. The use of a mixture of a mineral powder and cellulose powder is particularly advantageous in the production of filled papers, as the cellulose filler makes possible the retention of a larger amount of mineral filler than is usually possible. Ordinarily it is difficult to retain more than 3% to 4% mineral filler, but the powdered cellulose evidently serves to adsorb and fix the mineral filler to the fiber.

The powdered cellulose to be used in a given paper product may be derived from a fiber different from that used to form the body of the paper, but in the production of high grade papers in which "new rags" or a pure white wood pulp of high alpha cellulose content is employed, it is preferable that the cellulose powder be derived from a pure white fiber having the same characteristics as that of the fiber used in the body of the paper, in order to ensure a stable product, i. e., one which will stand up against the effects of time, heat, light, and air. The powdered cellulose may, however, be used in other kinds of paper, such as those made from sulphite or kraft pulp and intended for manufacture into books or magazines, wrappers, bags, towels, etc., in which case the pulverized cellulose may be derived from a source quite different from that represented by the fiber in the body of the paper. Papers containing pulverulent cellulose and made as hereinbefore described may be subjected to further treatment of a mechanical sort, such as calendering, or of a chemical sort, such as vulcanization or parchmentization, in which latter case the paper need not contain mineral fillers which impair the function of the chemical solutions used in the treatment.

While I have hereinbefore described the production of paper products containing pulverulent cellulose, the present invention comprehends a composition comprising cellulose fiber in a beaten or unbeaten condition, containing pulverulent cellulose such as may be marketed by the pulp manufacturer to the paper manufacturer. That is to say, a wood pulp manufacturer may, in accordance with the present invention, incorporate into the wood pulp being marketed in bulk form or in the form of so-called "dry sheets" the desired amount of pulverulent cellulose, so that the paper manufacturer need not go to the bother of even handling the pulverulent cellulose.

By the term "cellulose" or "cellulose fiber" as used in the appended claims, I mean cellulosic material which is largely free from non-cellulosic matter such as lignin, resins, etc., with which a raw cellulosic material such as wood is associated. I am aware of the fact that it has been proposed to use comminuted wood, such as sawdust or wood flour, in the manufacture of cheap papers or boards, but the presence of such material in papers is accompanied by a rapid yellowing and deterioration of the paper owing to the instability of such material under atmospheric conditions.

What I claim is:

1. An aqueous composition comprising cellulose powder and a hydrophilic colloid, said powder being of a particle size not exceeding about 40 mesh and consisting of mechanically subdivided but substantially unhydrated, white, cellulose fibers of a stable character.

2. A composition comprising a mixture of cellulose powder and a mineral powder, said cellulose powder being of a particle size not exceeding about 40 mesh and consisting of mechanically subdivided but substantially unhydrated, white, cellulose fibers of a stable character.

3. A composition comprising a mixture of cellulose powder and an adhesive, said powder being of a particle size not exceeding about 40 mesh and consisting of mechanically subdivided but substantially unhydrated, white, cellulose fibers of a stable character.

4. A composition comprising a mixture of cellulose powder, a mineral powder, and an adhesive, said cellulose powder being of a particle size not exceeding about 40 mesh and consisting of mechanically subdivided but substantially unhydrated, white, cellulose fibers of a stable character.

5. An aqueous composition comprising a mixture of powdered cellulose fiber and a water-soluble colloid, said powder being of a particle size not exceeding about 40 mesh and consisting of mechanically subdivided but substantially unhydrated, white, cellulose fibers of a stable character.

6. An aqueous composition comprising a mixture of powdered cellulose fiber and a water-soluble soap, said powder being of a particle size not exceeding about 40 mesh and consisting of mechanically subdivided but substantially unhydrated, white, cellulose fibers of a stable character.

7. An aqueous composition comprising a mixture of powdered cellulose fiber and rosin soap, said powder being of a particle size not exceeding about 40 mesh and consisting of mechanically subdivided but substantially unhydrated, white, cellulose fibers of a stable character.

8. An aqueous composition comprising a mixture of powdered cellulose fiber and a water-soluble adhesive, said powder being of a particle size not exceeding about 40 mesh and consisting of mechanically subdivided but substantially unhydrated, white, cellulose fibers of a stable character.

9. An aqueous composition comprising a mixture of powdered cellulose fiber and glue, said powder being of a particle size not exceeding about 40 mesh and consisting of mechanically subdivided but substantially unhydrated, white, cellulose fibers of a stable character.

10. An aqueous composition comprising a mixture of powdered cellulose fiber and casein, said powder being of a particle size not exceeding about 40 mesh and consisting of mechanically subdivided but substantially unhydrated, white, cellulose fibers of a stable character.

In testimony whereof I have affixed my signature.

GEORGE A. RICHTER.